US012614150B2

(12) United States Patent
Choi et al.

(10) Patent No.: US 12,614,150 B2
(45) Date of Patent: Apr. 28, 2026

(54) LOGISTICS MANAGEMENT SYSTEM AND LOGISTICS MANAGEMENT METHOD

(71) Applicant: CJ LOGISTICS CORPORATION, Seoul (KR)

(72) Inventors: Tae Jin Choi, Seoul (KR); Mu Kyun Park, Seoul (KR); Min Hee Kim, Seoul (KR); Hye Je Lee, Seoul (KR); Sung Sik Kim, Seoul (KR); Mun Seok Jang, Seoul (KR)

(73) Assignee: CJ LOGISTICS CORPORATION, Seoul (KR)

( * ) Notice: Subject to any disclaimer, the term of this patent is extended or adjusted under 35 U.S.C. 154(b) by 124 days.

(21) Appl. No.: 18/836,368

(22) PCT Filed: Mar. 22, 2023

(86) PCT No.: PCT/KR2023/003759
§ 371 (c)(1),
(2) Date: Aug. 7, 2024

(87) PCT Pub. No.: WO2023/182791
PCT Pub. Date: Sep. 28, 2023

(65) Prior Publication Data
US 2025/0117744 A1 Apr. 10, 2025

(30) Foreign Application Priority Data
Mar. 22, 2022 (KR) ........................ 10-2022-0035367

(51) Int. Cl.
G06Q 10/087 (2023.01)
B65G 1/137 (2006.01)
(Continued)

(52) U.S. Cl.
CPC ......... G06Q 10/087 (2013.01); B65G 1/1373 (2013.01); G05D 1/667 (2024.01);
(Continued)

(58) Field of Classification Search
CPC .. G06Q 10/087; G06Q 10/08; G06Q 10/0835; G06Q 10/083; G06Q 10/06316;
(Continued)

(56) References Cited

U.S. PATENT DOCUMENTS

| | | | |
|---|---|---|---|
| 10,922,637 B2 * | 2/2021 | Featherstone | G06Q 50/04 |
| 2013/0247519 A1 * | 9/2013 | Clark | B65B 59/02 |
| | | | 53/452 |

(Continued)

FOREIGN PATENT DOCUMENTS

| | | |
|---|---|---|
| JP | 2013-539103 A | 10/2013 |
| JP | 2015-042587 A | 3/2015 |

(Continued)

OTHER PUBLICATIONS

KR OA dated Jun. 11, 2024.

*Primary Examiner* — A. Hunter Wilder
(74) *Attorney, Agent, or Firm* — Harvest IP Law, LLP

(57) ABSTRACT

Disclosed are a logistics management system and a logistics management method. The logistics management system includes: an order processing system receiving an order request for each order; a box making system capable of making order boxes for a plurality of reference standards, wherein one reference standard is different from another reference standard in at least one among size and intensity; and a central control device capable of selecting any one among the plurality of reference standards based on the order request, and transmitting a box making command indicating the selected reference standard to the box making system, wherein the box making system makes an order box with the selected reference standard in response to the box making command and supplies the order box to a box supply zone.

12 Claims, 7 Drawing Sheets

Logistics management system(10)

(51) Int. Cl.

| | | |
|---|---|---|
| *G05D 1/667* | (2024.01) | |
| *G05D 1/69* | (2024.01) | |
| *G05D 105/20* | (2024.01) | |
| *G05D 107/70* | (2024.01) | |

(52) U.S. Cl.
CPC ........... *G05D 1/69* (2024.01); *G05D 2105/20* (2024.01); *G05D 2107/70* (2024.01)

(58) Field of Classification Search
CPC ........... G06Q 10/06395; B65G 1/1373; G05D 1/667; G05D 1/69; G05D 2105/20; G05D 2107/70; G05D 1/0225; G05D 1/0297; G05D 1/644; G05D 1/648; G05B 2219/31449; G05B 19/41865

See application file for complete search history.

(56) References Cited

U.S. PATENT DOCUMENTS

| | | | | |
|---|---|---|---|---|
| 2014/0067104 | A1* | 3/2014 | Osterhout | B31B 50/00 |
| | | | | 703/1 |
| 2019/0018427 | A1* | 1/2019 | Jeon | G05D 1/0011 |
| 2019/0127099 | A1* | 5/2019 | Langen | B65G 57/22 |

FOREIGN PATENT DOCUMENTS

| | | | |
|---|---|---|---|
| JP | 2020-083548 | A | 5/2020 |
| KR | 10-2011-0134583 | A | 12/2011 |
| KR | 10-2013-0139346 | A | 12/2013 |
| KR | 10-1572857 | B1 | 11/2015 |
| KR | 10-1632683 | B1 | 6/2016 |
| KR | 10-2020-0133901 | A | 12/2020 |
| WO | 2012-018859 | A1 | 2/2012 |

\* cited by examiner

[Figure 1 ]
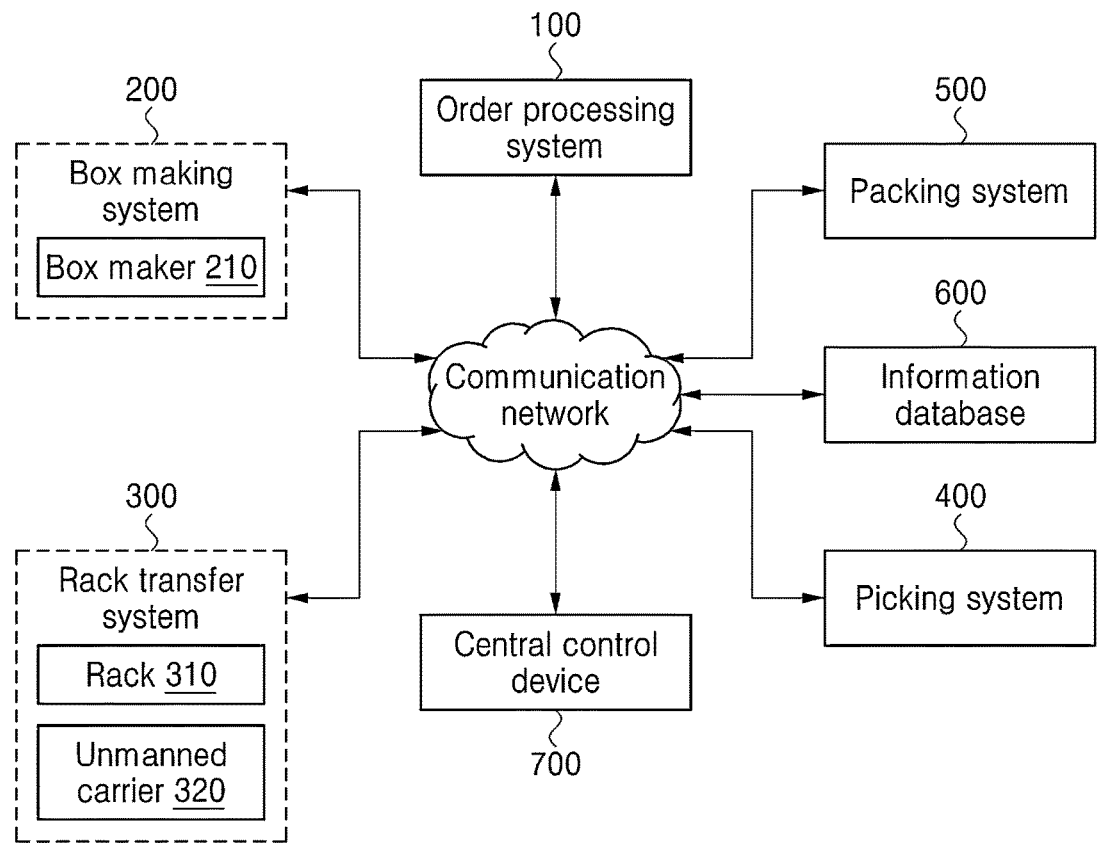
Logistics management system(10)

[Figure 2]
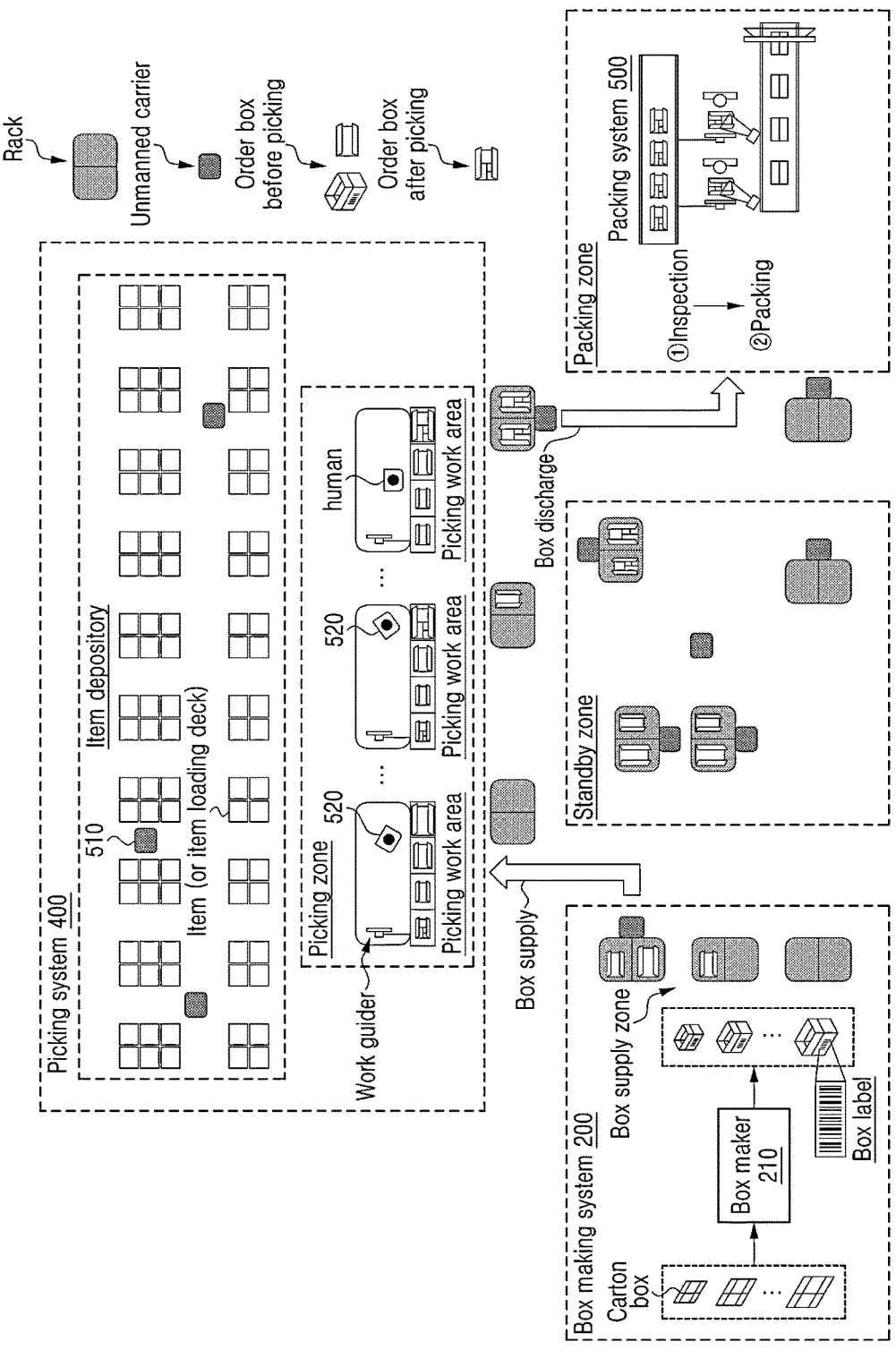

[Figure 3 ]
700
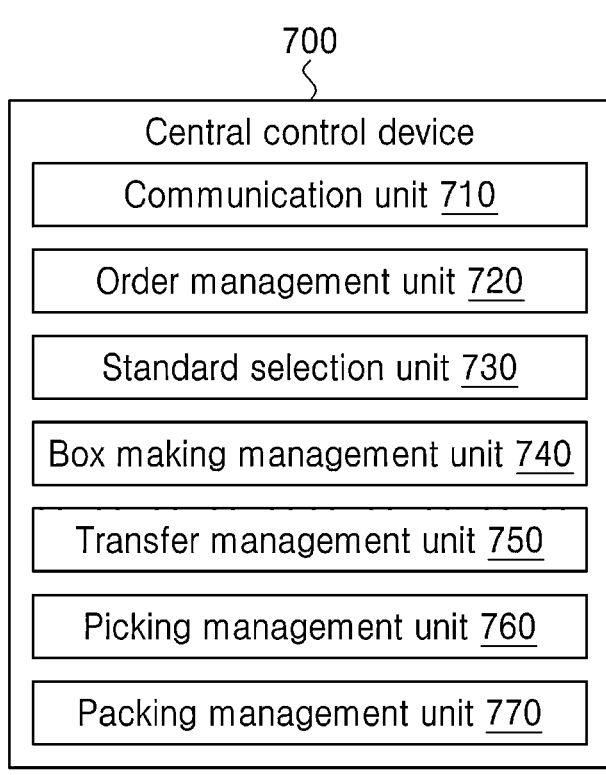

[Figure 4]
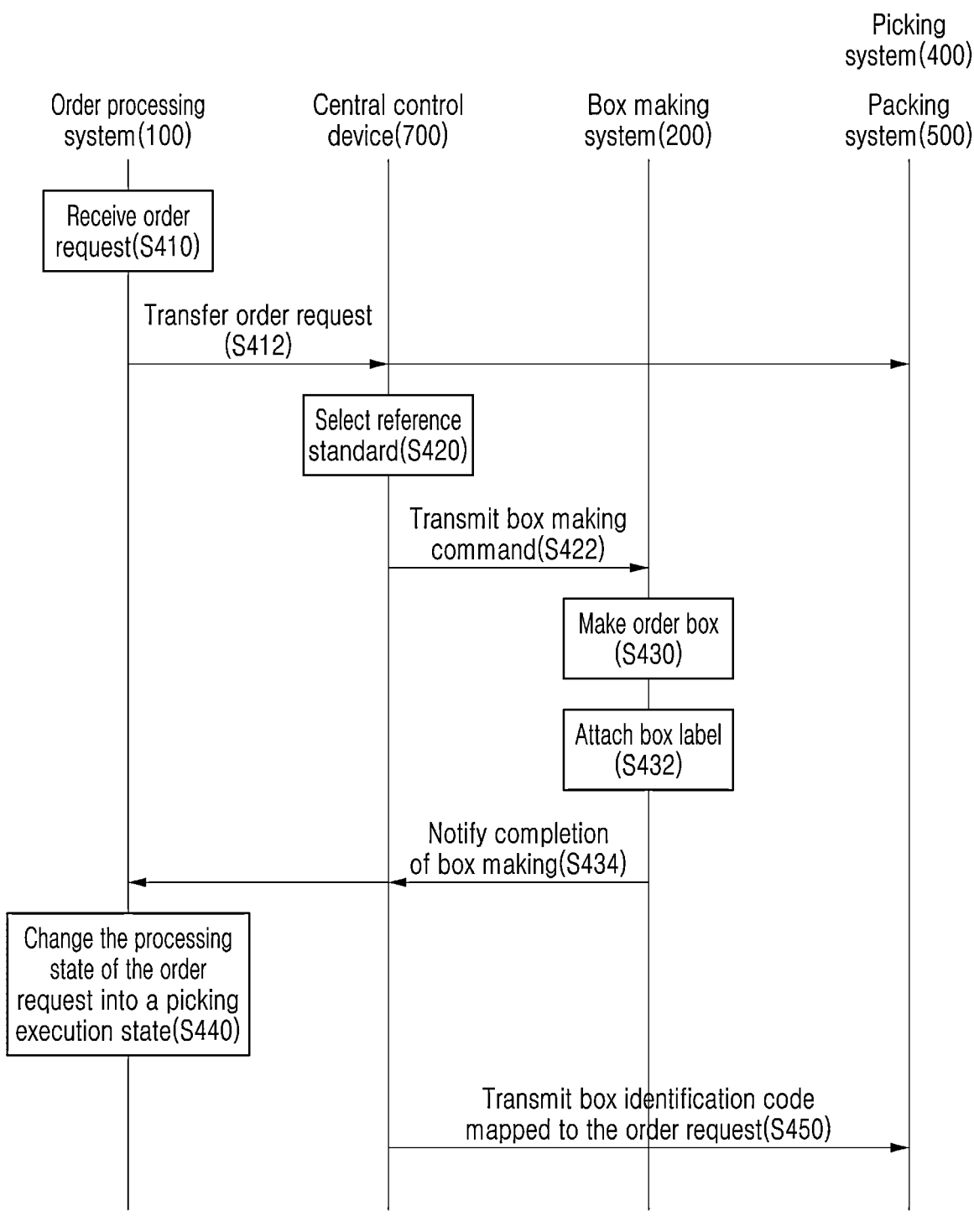

[Figure 5]
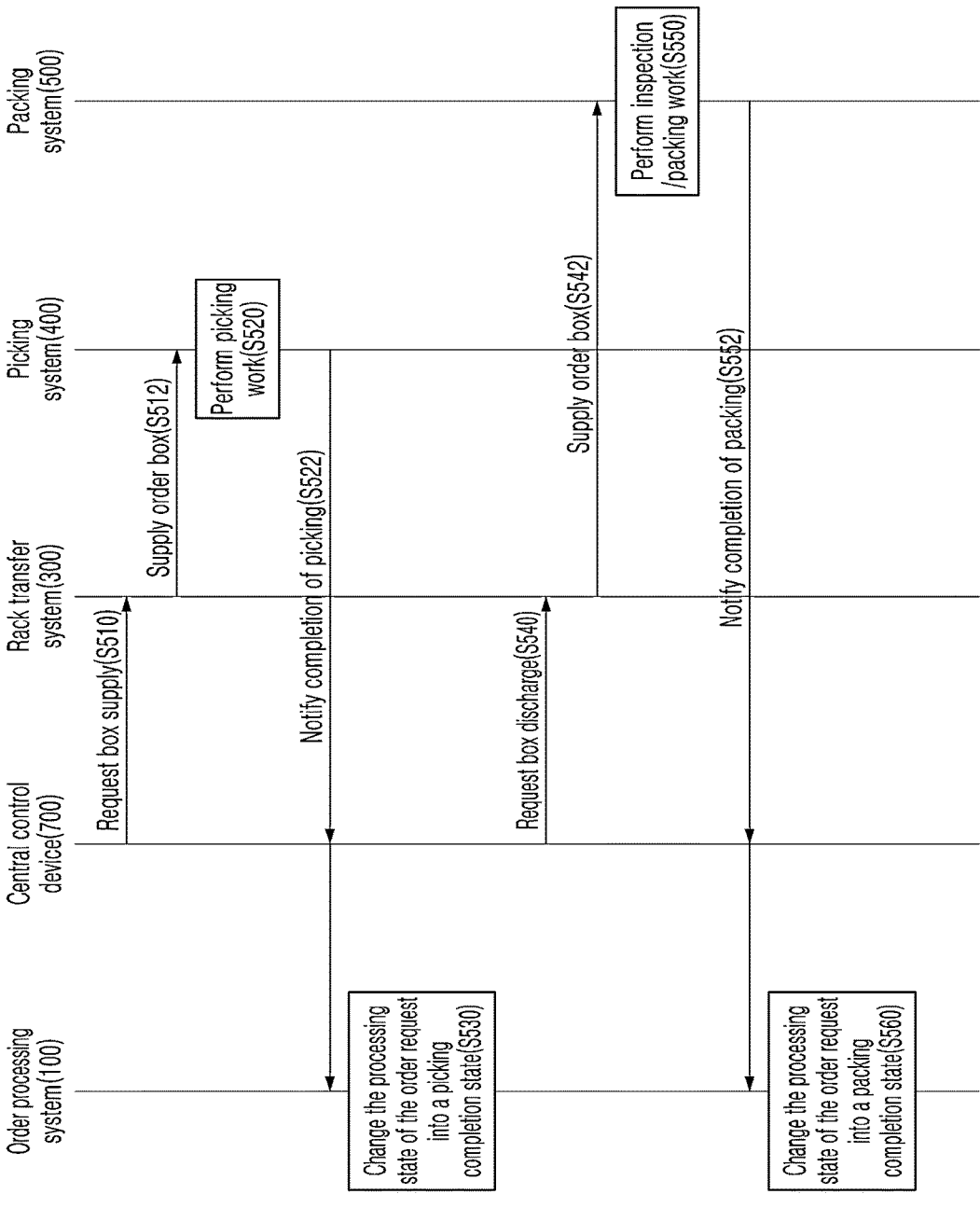

[Figure 6]
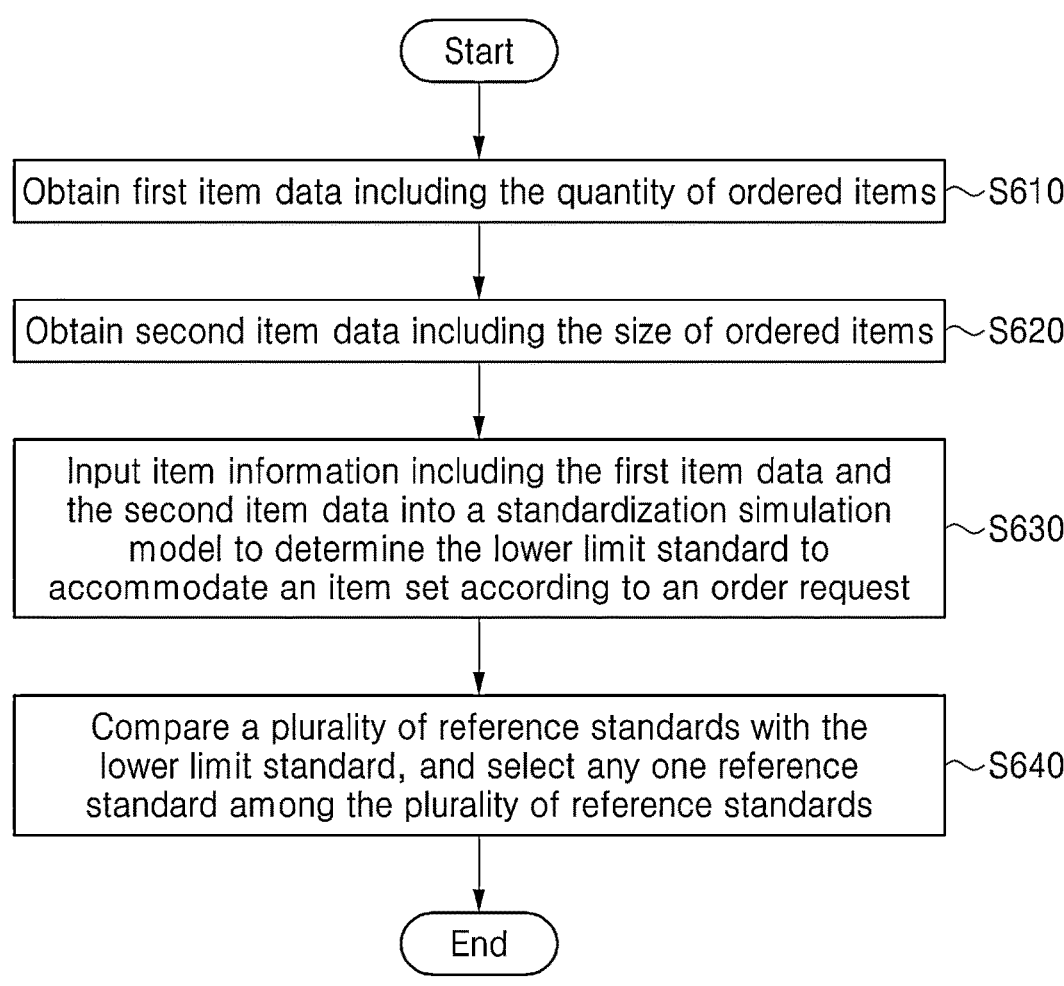

[Figure 7 ]
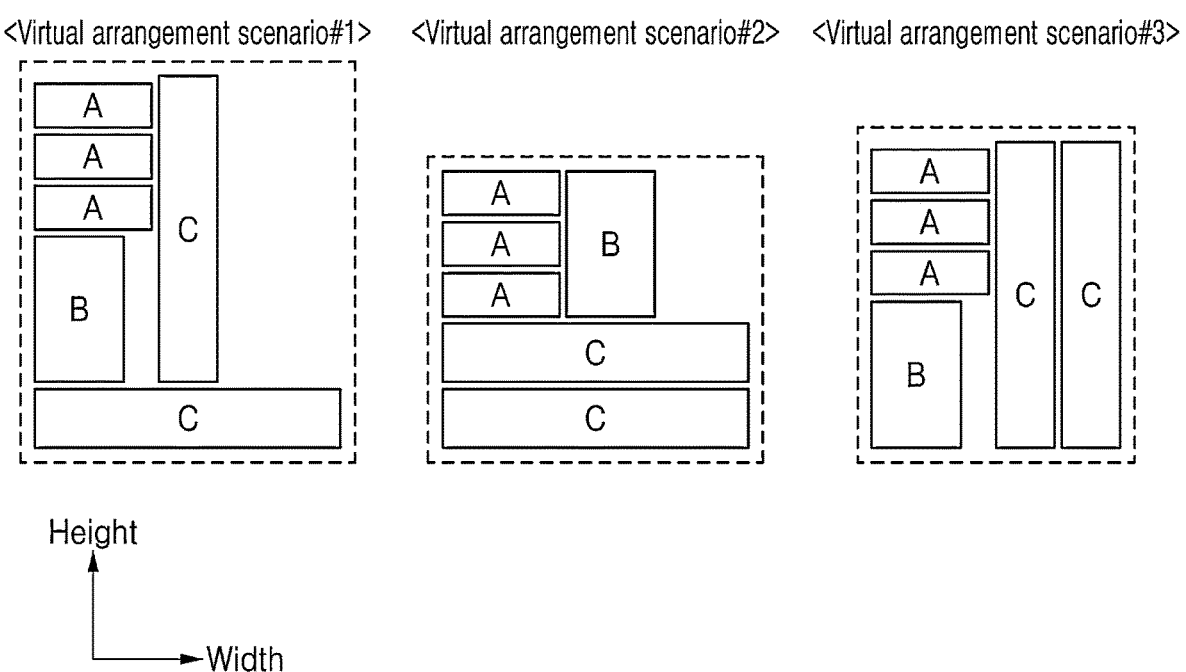
<Virtual arrangement scenario#1>    <Virtual arrangement scenario#2>    <Virtual arrangement scenario#3>
Height
Width

LOGISTICS MANAGEMENT SYSTEM AND LOGISTICS MANAGEMENT METHOD

CROSS REFERENCE TO RELATED APPLICATION(S)

This application is a National Stage of International Application No. PCT/KR2023/003759 filed on Mar. 22, 2023, claiming priority based on Korean Patent Application No. 10-2022-0035367 filed on Mar. 22, 2022, the disclosures of which is incorporated herein by reference in their entirety.

TECHNICAL FIELD

The present invention relates to a logistics management system, and more specifically, to a logistics management technology, which makes an order box having a standard suitable for storing an item set of order details for each order request, and automatically transfers the made order box to a zone in which picking work of the corresponding item set is performed, thereby effectively improving efficiency of logistics management.

BACKGROUND ART

Recently, a movement to introduce a logistics management system to a warehouse is actively performed in order to increase efficiency of logistics management due to an explosive growth of an E-commerce market.

The logistics management system refers to a system capable of providing a proxy service for at least a portion of all processes from the warehousing to the delivery of items by being entrusted from an individual or a company.

A measure for introducing an unmanned carrier called as an automated guided vehicle (AGV) may be presented to increase efficiency of logistics management.

The logistics management method based on goods to person (GTP) gets out of the conventional passive concept, and adopts a method of directly transferring an order box or an ordered item to a position of a worker by the unmanned carrier.

In order to simultaneously respond to an order request for various items, the conventional GTP method generally uses a box having a single standard for picking work (referred to as a 'tote box' in the relevant field). That is, when an order request is received, the unmanned carrier gives a tote box of the single standard to a picking worker, and the picking worker inserts an ordered item into the corresponding tote box to complete the picking work. When the picking work is completed, a packing worker inspects the item contained in the tote box, transfers the item contained in the tote box to an order box, and then, performs packing work for the order box. Thereby, the delivery preparation for the ordered item set is completed.

However, as described above, there are several major constraints due to the use of the tote box having the single standard fixed for the picking work. First, since additional work for transferring the item set contained in the tote box for picking to a delivery order box of a suitable standard is essentially required, the complexity and working time in the inspection and packing work are increased. Second, some items are likely to be lost while the item set is transferred from the tote box to the order box (box replacement work). Third, additional management costs, such as labor costs, are generated since human resources and material resources are required for the tote box transfer work from the picking work zone to the packing work zone and the box replacement work in the packing work zone.

DISCLOSURE

Technical Problem

Therefore, the present invention has been made in view of the above problems, and it is an object of the present invention to provide a logistics management system and a control method thereof, capable of making an order box of an appropriate standard according to an order request for each orderer and supplying the order box to be used in picking work and packing work for common use without using a tote box only for picking work.

In addition, it is an object of the present invention to provide a logistics management system and a control method thereof, capable of controlling operations and/or positions of a plurality of unmanned carriers depending on operation situations of a box supply zone, a picking zone, and a packing zone in a warehouse to which the logistics management system is applied.

Other objects and advantages of the present invention may be understood by the following description, and will become more clearly known by embodiments of the present invention. The objects and advantages of the present invention can also be realized by means and combination thereof shown in the claims.

Technical Solution

To achieve the above objects, the present invention provides a logistics management system including: an order processing system receiving an order request for each orderer; a box making system capable of making order boxes for a plurality of reference standards, wherein one reference standard is different from another reference standard in at least one among size and intensity; and a central control device capable of selecting any one among the plurality of reference standards based on the order request, and transmitting a box making command indicating the selected reference standard to the box making system, wherein the box making system makes an order box with the selected reference standard in response to the box making command and supplies the order box to a box supply zone.

The central control device determines a lower limit standard for storing an item set according to the order request, compares the plurality of reference standards with the lower limit standard, and selects any one among the plurality of reference standards.

The central control device inputs item information including the number and size of ordered items of the order request into a standardization simulation model to determine the lower limit standard, and the selected reference standard satisfies: (i) to be equal to or greater than the lower limit size; and (ii) to minimize a size difference with the lower limit standard.

The item information further includes at least one among a weight, a volume, and a three-dimensional shape for each ordered item of the order request.

The box making system attaches a box label, on which a box identification code is printed, to the order box of the selected reference standard.

The logistics management system further includes: a plurality of racks each having at least one loading space capable of loading the order box thereon; and a plurality of unmanned carriers each capable of transferring one of the plurality of racks from one of the box supply zone, the picking zone, and the packing zone to the other.

The central control device controls at least one of the plurality of unmanned carriers to transfer the rack, on which order boxes equal to or greater than a first reference quantity located in the box supply zone are loaded, to the picking zone.

The central control device assigns different priorities to a plurality of picking work areas in the picking zone, and controls at least one of the plurality of unmanned carriers to transfer the rack, on which the order boxes equal to or greater than the first reference quantity are loaded, to any one picking work area to which the highest priority is assigned, among the plurality of picking work zones.

In a case in which picking speed of the picking zone is less than a reference working speed, the central control device controls at least one of the plurality of unmanned carriers to temporarily transfer the rack, on which the order boxes equal to or greater than the first reference quantity located in the box supply zone are loaded, to a picking standby zone provided between the box supply zone and the picking zone.

Each of the plurality of racks further includes: a rack detector for generating rack monitoring data indicating an occupation state of each loading space provided on the rack. The central control device determines the quantity of the order boxes before picking loaded on the rack located in the picking zone, based on the rack monitoring data collected from the rack detector of the rack located in the picking rack. In a case in which the determined quantity of the order boxes before picking is between a first reference quantity and a second reference quantity, the central control device controls at least one of the plurality of unmanned carriers to transfer another rack, on which order boxes of more than the first reference quantity located in the box supply zone, to the picking zone.

The central control device determines the quantity of order boxes after picking, which are loaded on the rack located in the picking zone, based on the rack monitoring data collected from the rack detector of the rack located in the picking zone. In a case in which the determined quantity of the order boxes after picking is between the first reference quantity and a third reference quantity, the central control device controls at least one of the plurality of unmanned carriers to transfer the rack located in the picking zone to the packing zone.

The logistics management system further includes a packing system for performing inspection work and packing work with respect to the order boxes loaded on the rack transferred from the picking zone to the packing zone.

In another aspect of the present invention, there is provided a logistics management method including the steps of: receiving an order request for each orderer; selecting any one among a plurality of reference standards by the central control device, based on the order request, wherein one reference standard is different from another reference standard in at least one among size and intensity; transmitting a box making command indicating the selected reference standard to a box making system; and making an order box of the selected reference standard by the box making system in response to the box making command, and supplying the order box to a box supply zone.

The step of selecting any one among a plurality of reference standards includes the steps of: determining a lower limit standard for storing an item set according to the order request; and comparing the plurality of reference standards with the lower limit standard, and selecting any one among the plurality of reference standards.

The step of determining a lower limit standard includes the step of inputting item information including the number and size of ordered items of the order request into a standardization simulation model to determine the lower limit standard. The selected reference standard satisfies: (i) to be equal to or greater than the lower limit size; and (ii) to minimize a size difference with the lower limit standard.

Advantageous Effects

According to at least one of embodiments of the present invention, the logistics management system and the logistics management system can make an order box of an appropriate standard according to an order request for each orderer, and supply the order box to be used in picking work and packing work for common use without using a tote box only for picking work. Therefore, compared with the conventional method using the tote box only for picking work, the present invention can allow a worker to perform picking work and discharging work using the order box suitable for the standard of an item without recovering work and replacement work of the tote box, thereby reducing the amount of buffer materials used for preventing damage to the item to prevent excessive packaging, and increasing the amount of items loaded in a delivery vehicle as much as the reduction of the excessive packaging.

Therefore, the present invention can omit box replacement work by using the order box suitable for the standard of the delivery item from picking work, thereby simplifying the inspection and packing work, reducing the possibility of item loss, and minimizing the input of human resources and material resources required for linking the picking work and the packing work.

In addition, according to at least one of embodiments of the present invention, the logistics management system and the logistics management method can provide appropriate transfer work to a plurality of unmanned carriers and dynamically control supply and discharge of the order box depending on operation situations of a box supply zone, a picking zone, and a packing zone in a warehouse to which the logistics management system is applied, thereby effectively operating the entire working space of the warehouse.

The effects are not limited to the above-described objects and other effects that have not been described will be evidently understood by those skilled in the art from the claims.

DESCRIPTION OF DRAWINGS

The following drawings attached to the present specification illustrate preferred embodiments of the present invention, and serve to further understand the technical idea of the present invention together with the detailed description of the invention described below. Therefore, the present invention should not be construed as being limited to only the matters disclosed in the drawings.

FIG. 1 is a diagram illustrating a configuration of a logistics management system according to an embodiment of the present invention.

FIG. 2 is a diagram schematically illustrating an exemplary appearance of a warehouse applied to the logistics management system of FIG. 1.

FIG. 3 is a diagram illustrating a configuration of a central control device of FIG. 1.

FIGS. 4 and 5 are flow charts schematically illustrating an exemplary logistics management method using a logistics management system according to an embodiment of the present invention.

FIG. 6 is a flow chart illustrating a detailed description of a sub-routine set included in a reference standard selection step of FIG. 4.

FIG. 7 is a diagram for depicting a flow chart of FIG. 6.

MODE FOR INVENTION

The details of the objects and technological configurations of the present invention and corresponding advantages will become more clearly understood from the following detailed description based on the drawings accompanied by the specification of the present invention. Exemplary embodiments of the present invention will be described in detail with reference to the accompanying drawings.

The embodiments disclosed herein should not be interpreted or used as limiting the scope of the invention. It is obvious to a person skilled in the art that the description including embodiments of the present specification has various applications. Therefore, any embodiments described in the detailed description of the present invention are exemplary for better explaining the present invention and are not intended to limit the scope of the present invention to embodiments.

The functional blocks shown in the drawings and described below are merely examples of possible implementations. Other functional blocks may be used in other embodiments without departing from the spirit and scope of the detailed description. Furthermore, while one or more functional blocks of the present invention are represented by individual blocks, one or more of the functional blocks of the present invention may be a combination of various hardware and software configurations executing the same function.

Terms including ordinal numbers such as first, second, etc. are used for the purpose of distinguishing any one of various components from the rest, and are not used to limit the components by such terms.

It should be also understood that the terms of 'include' or 'have' in the specification are 'open type' expressions just to say that components exit and do not exclude additional components.

Additionally, it should be also understood that the expression that some component is 'connected' to another component means that some component is directly connected to another component or is connected to another component through a further component.

FIG. 1 is a diagram illustrating a configuration of a logistics management system according to an embodiment of the present invention, FIG. 2 is a diagram schematically illustrating an exemplary appearance of a warehouse applied to the logistics management system of FIG. 1, and FIG. 3 is a diagram illustrating a configuration of a central control device of FIG. 1.

Referring to FIGS. 1 and 2, the logistics management system 10 includes an order processing system 100, a box making system 200, and a central control device 700. The logistics management system 10 may further include at least one of a rack transfer system 300, a picking system 400, a packing system 500, and an information database 600. Hereinafter, it is assumed that the logistics management system 10 includes all of the rack transfer system 300, the picking system 400, the packing system 500, and the information database 600 as well as the order processing system 100, the braking system 200, and the central control device 700.

The order processing system 100 may collect an order request for each orderer, and record the collected order request in the information database 600.

The collection of order request may be repeated at periodic or non-periodic time intervals. In a case in which multiple order requests are collected over each order collection period, the order processing system 100 may collect the multiple order requests to generate order status information.

The order status information may be a set of data describing a state in which an order request registered in at least one orderer is classified according to each processing state. The order status information may be recorded, deleted, and/or updated in the information database 600 in units of a batch of order requests or an individual order request contained therein. For example, the processing state for each order request may be changed in the order of (i) an order receiving state, (ii) a picking execution state, (iii) a picking completion state, (iv) a packing execution state, and (v) a packing completion state. The (i) order receiving state may be a state before the corresponding order request is transferred to picking work after being received by the order processing system 100. The (ii) picking execution state may be a state in which making work of an order box corresponding to the order request is completed and picking work of the corresponding order box is executable. The (iii) picking completion state may be a state in which an item set according to the order request is stored in the order box. The (iv) packing execution state may be a state in which the order box in which the item set according to the order request is stored is transferred to a packing zone. The (v) packing completion state may be a state in which the packed item set is finally deliverable after inspection work and packing work in the packing zone are completed.

The order request includes order details in which the contents of at least one order item needed to discriminate the corresponding order request from other order requests are described. The order details include, for example, an order place (e.g., an orderer name, an orderer address, and the like), an order reception time, an item list (e.g., names of one or more items in the same order request), the quantity of items, and the like.

The box making system 200 can make order boxes having a plurality of reference standards, and supplies (discharges) the made order boxes to a box supply zone in the warehouse.

The box making system 200 has a box forming function and a label attaching function. The box making system 200 performs the box forming function as a response to a box making command to form an input carton box, thereby making an order box having a reference standard required for the corresponding box making command. For reference, the box making command may be received from the central control device 700 to be described later.

The box making system 200 includes at least one box maker 210. Each box maker 210 may be a standard-fixed type box maker capable of making only an order box having only one reference standard among the plurality of reference standards, or a standard-variable type box maker capable of selectively making order boxes having at least two different reference standards among the plurality of reference standards.

The reference standard defines at least one of a size and an intensity of the order box for performing the box making work, wherein each reference standard is different in size and intensity from other reference standards. Intensity is associated with at least one of a box material (e.g., paper, plastic), a box thickness, and a box corrugation type.

For example, a first reference standard defines a first size (e.g., a width of 10 cm, a length of 20 cm, a height of 30 cm), and a first intensity (e.g., the maximum weight of 3 kg), a second reference standard defines a second size (e.g., a width of 20 cm, a length of 30 cm, a height of 40 cm), and a first intensity (e.g., the maximum weight of 3 kg), a third reference standard defines a first size and a second intensity (e.g., the maximum weight of 5 kg), and a fourth reference standard defines a second size and a second intensity. The box maker 210 supplies the formed order box before picking to a box supply zone provided in a warehouse. The order box before picking may be formed in such a way that a portion (for example, an upper portion) is opened and the remaining portion (for example, a lower portion) is sealed to accommodate an item therein. In the present specification, the order box before picking refers to an order box in a state in which an item set according to an order request is not accommodated therein after the box making work. In addition, the order box after picking refers to an order box in which the item set according to the order request is stored.

The central control device 700 is operatively coupled to the order processing system 100 and the box making system 200. The central control device 700 receives an order request from the order processing system 100 and analyzes the received order request to control the box making system 200. In this instance, the central control device 700 may access the order processing system 100 periodically at fixed time intervals or non-periodically at variable time intervals to collect order status information including at least one order request to be processed.

The central control device 700 includes a communication unit 710, an order management unit 720, a standard selection unit 730, a box making management unit 740, and a transfer management unit 750, and further includes a picking management unit 760 and a packing management unit 770. The central control device 700 includes at least one processor, and each of the order management unit 720, the standard selection unit 730, the control box management unit 740, and the transfer management unit 750 may be installed in at least one processor and provided as a form of a software module executable in accordance with circumstances.

The communication unit 710 is coupled to at least one of the order processing system 100, the box making system 200, the rack transfer system 300, the picking system 400, and the packing system 500 through a wired/wireless communication network to transmit and receive information related to logistics management in one direction or both directions. For example, the communication unit 710 may collect an order request from the order processing system 100, monitor work situations of the box making system 200, the picking system 400, and the packing system 500, identify an operation mode or a location of an unmanned carrier 320, and monitor a state of a rack 310.

The order management unit 720 may basically record each order request collected by the communication unit 710, monitor the processing state of the order request through collaboration with the order processing system 100, and request the order processing system 100 to change the processing state.

The standard selection unit 730 may select at least one reference standard corresponding to the order request among the plurality of reference standards for each order request. In this instance, a single reference standard may be selected or two or more reference standards may be selected in response to a single order request.

According to the reference standard selected by the standard selection unit 730, the box making management unit 740 may allocate the box making work related to the order request to the box making system 200, and monitor the work situation of the box making work allocated to the box making system 200.

In response to the reception of the box making command, the box making system 200 may manufacture an order box having the reference standard required by the box making command, attach a box level, on which a box identification code is printed, to the corresponding order box, and supply the order box to the box supply zone, thereby completing the box making work according to the box making command. The box making system 200 may report the completion of the box making work according to the box making command to the central control device 700.

The box identification code is uniquely assigned to an order box to which it is attached, and may be, for example, any one or a combination of a character, a symbol, and a figure, such as a barcode, a QR code, or the like. The control system 200 notifies at least one of the central control device 700 and the order processing system 100 of the box identification code assigned to the completed order box. The box identification code is mapped to the order request describing the item set to be stored in the order box to which the box identification code is assigned. The order request mapped to the box identification code may be transferred to the picking system 400 and the packing system 500. Thereafter, a worker associated with the picking system 400 and the packing system 500 may use a scanner to scan the box label attached to the order box to check order details according to the order request matched to the order box, and perform picking work or packing work.

The central control device 700 may monitor a work situation of the box making work performed by the box making system 200, and manage an overall box making work schedule executed by the braking system 200 according to the order request. For example, the box making management unit 740 may aggregate the remaining quantity of the box making work allocated to each of the box making system 200, the quantity of the box making work completed by each of the box making system 200, the remaining quantity of order boxes in the box supply zone, and the remaining quantity of carton boxes put into each box making system 200. The carton box refers to a box material in a folded state before being formed into the form of an order box by the box making system 200.

In a case in which the plurality of box makers 210 are mapped to the plurality of reference standards in a one-to-one manner, the box making management unit 740 may reduce unnecessary power consumption in the corresponding box making system 200 by temporarily switching, to an idle state (a power saving mode), the box maker 210 related to the specific reference standard without an order request among the plurality of reference standards.

The information database 600 records item information about the entire items stored in the item repository. The item information includes data for individual items, such as storage location, price, inventory, item characteristics (e.g., size, shape, volume, weight) for each item.

The rack transfer system 300 includes a plurality of racks 310 and a plurality of unmanned carriers 320.

The rack 310 has at least one loading space, and can be loaded in each loading space while the order box before and after picking is mounted on a pallet.

The unmanned carrier 320 may be referred to as an automated guided vehicle (AGV). The unmanned carrier 320 can be coupled to the rack 310 located in the warehouse, and can transport the combined rack 310 from any one of the box supply zone, the picking zone, and the packing zone to the other.

Each rack 310 may be provided with at least one rack monitor. The rack monitor may generate rack monitoring data indicating an occupation state of each loading space provided on the rack 310 having the rack monitor. The rack monitoring data may further indicate position data of the rack 310 in the warehouse.

For example, the transfer management unit 750 may identify whether the loading space is empty or is in a state in which the order box is loaded through vision processing for photographed images of each loading space collected as rack monitoring data, and discriminate whether the order box loaded in each loading space is an order box before or after picking. As another example, the rack monitor may include a scanner for scanning the box label attached to the order box loaded in each loading space, and can discriminate whether the order box is an order box before picking or an order box after picking through scanning. For reference, a picking worker may scan the box label of the order box that the worker has completed picking work and request to change the processing state of an order request associated with the corresponding order box into a picking completion state. Thereafter, in a case in which the same box label is scanned, the corresponding order box may be identified as an order box after picking.

The communication unit 710 may collect rack monitoring data from the rack monitor through a wired/wireless communication network, and the picking management unit 760 may determine a picking association state of each rack 310 located in the picking zone based on the collected rack monitoring data. Specifically, the picking management unit 760 may determine that the corresponding rack 310 is in a first rack state in a case in which the order boxes before picking are unloaded from all loading spaces of the rack 310 transferred from the box supply zone to the picking zone. Meanwhile, in a case in which the order boxes of the second box state are loaded in all loading spaces of the rack 310 determined as the first rack state, the picking management unit 760 may determine that the rack 310 is in a second rack state.

The transfer management unit 750 may assign transfer work to at least one of the plurality of unmanned carriers 320 or control a position in at least one depository of the plurality of unmanned carriers 320, based on data indicating a work situation of at least one of the box supply zone, the picking zone, and the packing zone collected by the communication unit 710.

For example, in a case in which the quantity of the order boxes loaded in the box supply zone is greater than or equal to a threshold quantity (surplus box supply), the box making management unit 740 may reduce the speed of the box making work performed in the box making system 200, and the transfer management unit 750 may increase the number or ratio of the unmanned carriers 320 operating in the first transfer mode such that the order boxes excessively supplied to the box supply zone are quickly transferred to the picking zone. In this case, a speed control of the box making work and the number or ratio of the unmanned carriers 320 operating in the first transfer mode are based on a difference between the remaining quantity of the order boxes in the box supply zone and a threshold quantity. The first transfer mode is a mode in which the rack 310 on which the order boxes equal to or greater than the first reference quantity located in the box supply zone is transferred to the picking zone, and may be referred to as a box supply mode.

As another example, in a case in which the picking speed in the picking zone is less than a reference speed (picking work delay), the box making management unit 740 may reduce the box making speed of the box making system 200. Alternatively, the unmanned carrier 320 operating in the first transfer mode may control the rack 310, on which the order boxes of the first reference quantity or higher are loaded, to be temporarily transferred to a picking standby zone provided between the box supply zone and the picking zone until the transfer management unit 750 recovers the picking speed to a normal level above the reference working speed.

Accordingly, it can prevent a bottleneck phenomenon in which the plurality of unmanned carriers 320 are intensively moved to the picking zone can be prevented.

As another example, in a case in which the quantity of the order boxes before picking loaded on the rack 310 located in the picking zone is reduced between a first reference quantity and a lower limit quantity, at least one of the plurality of unmanned carriers 320 may be controlled to previously transfer another rack 310 located in the box supply zone, in which order boxes equal to or greater than the first reference quantity are loaded, to the picking zone.

As another example, in a case in which the quantity of the order boxes after picking loaded on the rack 310 located in the picking zone is equal to or greater than a second reference quantity, at least one of the plurality of unmanned carriers 320 may be controlled to operate in a second transfer mode. The second transfer mode is a mode in which the rack 310, on which the order boxes equal to or greater than the second reference quantity located in the picking zone are loaded, is transferred to the packing zone, and may be referred to as a box discharge mode. The second reference quantity may be equal to or greater than the first reference quantity.

As another example, in a case in which the packing speed in the packing zone is lower than the reference speed (inspection work or packing work delay), instead of reducing the picking speed of the picking system 400, the unmanned carrier 320 operating in the second transfer mode controls the rack 310, on which the order boxes after picking are loaded, to temporarily move to a standby zone provided between the picking zone and the packing zone until both the inspection work and the packing work in the packing zone are recovered to a normal level, thereby preventing the bottleneck phenomenon in which the plurality of unmanned carriers 320 are intensively moved to the packing zone. In addition, among the plurality of unmanned carriers 320, each unmanned carrier 320, which did not receive transfer work from the central control device 700, can also move to the standby zone to wait for a work instruction.

As another example, in a case in which the picking zone is divided into a plurality of picking work areas for a plurality of picking worker groups, the transfer management unit 750 may adjust the number of order boxes before picking supplied (transferred) for each picking worker (or picking work area) by at least one of the plurality of unmanned carriers 320 in accordance with the working speed for each picking worker (or picking work area). That is, relatively more order boxes before picking are transferred to the picking work aera having a fast working speed, and relatively fewer picking boxes are transferred to the picking work area having a slow working speed.

The picking management unit 760 may monitor the overall picking work situation in the picking zone and distribute picking work for each picking worker located in the picking zone.

In the picking zone, a plurality of picking workers perform picking work assigned thereto, respectively. The picking workers may be human beings or picking robots 510 and 520. Like the unmanned carriers 320, the picking robots 510 and 520 may be autonomous vehicles controllable through communication with the central control device 700. In FIG. 2, the picking robot 510 puts items into the order boxes before picking in the picking zone, and the picking robot 520 finds and delivers the items according to the order details to the picking robot 510 in the item depository. The picking worker may scan the box label attached on the order box before picking transferred to the picking zone with a scanner, and obtain details of an order request matching the corresponding order box from at least one of the order processing system 100 and the central control device 700. The obtained order request may be held by the picking worker or visually displayed on a screen of a work guide machine installed in the picking zone.

The picking worker may unload the order box before picking from the rack 310 to the picking work area, search an item set from the item repository according to details of the order request obtained through scanning, and put the item set into the corresponding order box. Accordingly, the order box before picking is switched to an order box after picking.

The picking worker may scan the box label attached to the order box after picking to notify at least one of the order processing system 100 and the central control device 700 to complete picking for the order request associated with the order box, and at least one of the order processing system 100 and the central control device 700 may change the processing state of the order request notified by the picking worker from a picking execution state to a picking completion state. The picking management unit 760 may calculate a working speed for each picking worker, on the basis of the number of picking completion reports for each unit time and the picking work quantity performed by the picking worker. The picking work quantity for each order request may be based on a weighted sum of work scores given in advance to any one or at least two of the number of items, the quantity of each item, the weight of each item, and the standard of the order box according to the order request.

The picking management unit 760 may assign different priorities to a plurality of picking work zones according to the picking speed of each picking work area in the picking zone. In this instance, a higher priority is assigned to a picking work area having a fast picking speed. The transfer management unit 750 may control at least one of the plurality of unmanned carriers 320 to transfer the rack on which an order box having the first reference quantity or more is loaded to the picking work are to which the highest priority is assigned among the plurality of picking work areas.

The packing management unit 770 may monitor the inspection work state and the packing work state performed in the packing system 500. For example, according to packing work instructions from the packing management unit 770, the packing system 500 may perform taping or binding with respect to the order box after picking, which has any one of the plurality of reference standards described above, to seal the order box. The packing management unit 770 receives a notification of the completion of the packing work for each ordered item from the packing system 500, and supports the order processing system 100 to change the processing state of the ordered item into a packing completion state.

The communication unit 710 may collect rack monitoring data from the rack monitor through a wired/wireless communication network, and the packing management unit 770 may determine a packing association state of the racks 310 located in the packing zone based on the collected rack monitoring data. Specifically, the packing management unit 770 may request the transfer management unit 750 to supply a box to the picking system 400 in a case in which the order box after picking is unloaded from all loading spaces of the rack 310 transferred to the packing zone.

The packing system 500 may scan the box label attached to the order box after picking unloaded from the rack 310 transferred to the packing zone to obtain order details of the order request matching the corresponding order box from at least one among the order processing system 100 and the central control device 700. Additionally, the packing system 500 may obtain inspection information through vision processing of photographed images or weight measurement of the order box after picking, and compare the obtained order details with respect to the same order box with the inspection information, thereby determining whether all of the item sets according to the corresponding order request are put into the order box without missing, whether the total weight of the order box and the total weight of the item sets according to the order request are within an allowable error range. Here, the inspection information may, for example, indicate integrity of the picking work, which is obtained through optical reading, weight measurement, or the like for appearance photographing data of the order box. In addition, the packing system 500 may directly print the delivery destination information (additionally, advertisement information) in each order box passing through the inspection work or attach an invoice label on which the delivery destination information (additionally advertising information) is printed to discharge to a delivery zone. The advertisement information includes, for example, a brand logo, a promotional phrase, and the like previously registered/requested for each seller. For reference, the delivery destination information of each order box can be obtained from an order request transmitted from at least one of the order processing system 100 and the central control device 700.

The packing management unit 770 may calculate a working speed for each packing worker, on the basis of the number of packing completion reports for each unit time and the packing work quantity performed by the packing worker. The packing work quantity for each order request may be based on a weighted sum of work scores given in advance to any one or at least two of the number of items, the quantity of each item, the weight of each item, and the standard of the order box according to the order request.

FIGS. 4 and 5 are flow charts schematically illustrating an exemplary logistics management method using a logistics management system according to an embodiment of the present invention. For convenience of description, FIG. 4 illustrates a process from order reception to the box making work, and FIG. 5 illustrates a process from completion of the box making work to packing work.

Referring to FIGS. 1 to 4, in step S410, the order processing system 100 receives an order request for each orderer through a wired/wireless communication network. The order processing system 100 may record order details of the order request in the information database 600.

In step S412, the order processing system 100 transmits the order request to the central control device 700. The order request may be further transmitted to at least one of the picking system 400 and the packing system 500.

In step S420, the central control device 700 selects any one of the plurality of reference standards on the basis of the order request.

In operation S422, the central control device 700 transmits a control command indicating the selected reference standard to the system 200.

In step S430, the box making system 200 makes an order box having the selected reference standard in response to the box making command.

In step S432, the box making system 200 attaches a box label on which the box identification code is printed to the order box. Accordingly, the order box before picking is discharged to the box supply zone.

In step S434, the box making system 200 notifies at least one of the order processing system 100 and the central control device 700 of completion of the box-making according to the box making command. A box identification code mapped to the order request may be included in the notification about completion of the box-making.

In step S440, the order processing system 100 changes the processing state of the order request into a picking execution state.

In step S450, the central control device 700 transmits the box identification code mapped to the order request to at least one of the picking system 400 and the packing system 500.

Through the steps of S410 to S450, the picking work for the received order request is in an executable state.

In step S510, the central control device 700 transmits a box supply request to the rack transfer system 300 to supply an order box before picking to the picking system 400. At least one of the plurality of unmanned carriers 320 of the rack transfer system 300 operates in the first transfer mode according to the box supply request.

In step S512, the at least one unmanned carrier 320 operating in the first transfer mode of the rack transfer system 300 transfers the rack 310, on which the order box before picking is loaded, from the box supply zone to the picking zone. That is, the order box before picking is supplied to the picking system 400 from the box making system 200.

In step S520, the picking system 400 performs the picking work for putting an item set according to the order request in the order box before picking, which is transferred to the picking zone.

In step S522, the picking system 400 notifies at least one of the order processing system 100 and the central control device 700 of completion of picking for the order request.

In step S530, the order processing system 100 changes the processing state of the order request into the picking completion state.

In step S540, the central control device 700 transmits a box discharge request for discharging the order box after picking from the picking system 400 to the rack transfer system 300. At least one of the plurality of unmanned carriers 320 of the rack transfer system 300 operates in the second transfer mode according to the box discharge request.

In step S542, the at least one unmanned carrier 320 operating in the first transfer mode of the rack transfer system 300 transfers the rack 310, on which the order box after picking is loaded, from the picking zone to the packing zone. That is, the order box after picking is discharged from the picking system 400, and is supplied to the packing system 500.

In step S550, the packing system 500 performs inspection work and packing work for the order box after the picking transferred to the packing zone.

In step S552, the packing system 500 notifies at least one of the order processing system 100 and the central control device 700 of completion of packing for the order request.

In step S560, the order processing system 100 changes the processing state of the order request into a packing completion state.

FIG. 6 is a flow chart illustrating a detailed description of a sub-routine set included in a reference standard selection step according to the step S420 of FIG. 4, and FIG. 7 is a diagram for depicting a flow chart of FIG. 6.

Referring to FIG. 6, in step S610, the standard selection unit 730 obtains first item data from the order details of an order request. The first item data includes the quantity per order item.

In step S620, the standard selection unit 730 obtains second item data from the information database 600. The second item data includes the size for each ordered item of the order details. The second item data may further include at least one of weight, volume, and a three-dimensional shape for each ordered item. The size of the ordered item indicates a width, a depth, and a height of a virtual rectangular parallelepiped having the minimum volume capable of arranging the ordered item, and may be pre-recorded in the information database 600 through pre-measurement. In this instance, the size of the ordered item may represent a three-dimensional dimension of the ordered item, or may represent a size in a state in which the outer surface of the ordered item is packed with a cushioning material.

In step S630, the standard selection unit 730 inputs item information including the first item data and the second item data into a standardized simulation model, and determines a lower limit standard for receiving the item set according to the order request. That is, the standardization simulation model receives item information as an input and outputs a lower limit standard as a result. The lower limit includes a minimum required size and additionally includes a minimum required intensity.

The standardization simulation model may be a model based on pre-trained artificial intelligence. The standardized simulation model may change an arrangement location and an arrangement posture of each order item included in the item set in a virtual three-dimensional space, and repeat the process of changing the arrangement order between the ordered items, thereby finding a virtual rectangular parallelepiped having the minimum volume in which all ordered items of the item set can be accommodated, and determining the minimum required size indicating the width, the depth, and the height of the found virtual rectangular parallelepiped.

In addition, the standardization simulation model may generate arrangement guide information indicating the arrangement location, arrangement posture, and arrangement order of each of all ordered item sets within the virtual rectangular parallelepiped associated with the minimum required size. The standard selection unit 730 can map the arrangement guide information to the order request. The arrangement guide information mapped to the order request can be transmitted to the picking system 400 together with a box identification code in step S450. Additionally, the standardization simulation model may determine the minimum required intensity based on the total weight of the item set.

FIG. 7 illustrates a situation in which an order request with order details of three A items, two B items, and one C item is received. For convenience of description, it is assumed that the heights of items A, B, and C are the same. Referring to FIG. 7, the standard selection unit 730 generates a plurality of virtual deployment scenarios (for example, #1 to #3) indicating respective arrangement situations while changing the arrangement position, arrangement posture, and arrangement order of the ordered items by using the standardization simulation model. Each of the plurality of virtual arrangement scenarios (for example, #1 to #3) is associated with a unique three-dimensional size, and the standard selection unit 730 may determine the minimum size among three-dimensional sizes of the plurality of virtual arrangement scenarios (for example, #1 to #3) as the minimum required size, and provide a virtual arrangement scenario (for example, #3) related thereto as the arrangement guide information to the picking system 400. In a case in which a box label attached to the order box before picking is scanned by a picking worker, the picking system 400 may call arrangement guide information together with the order request mapped to the scanned box label to display a guide image corresponding to the arrangement guide information on a picking work screen. The picking worker can put the item set into an order box before picking with reference to a guide image displayed on the picking work screen, thereby improving efficiency of the picking work.

In step S640, the standard selection unit 730 selects any one of the plurality of reference standards by comparing the plurality of reference standards with the lower limit standard. The selected reference standard may satisfy the following conditions: (i) to be equal to or greater than the lower limit size, and (ii) to minimize a size difference with the lower limit standard. In a case in which there are a plurality of reference standards satisfying the condition (i), any one reference standard in which the weighted sum of a width difference, a depth difference, and a height difference between the reference standard and the lower limit standard is the minimum may be selected when applying the condition (ii).

While the exemplary embodiments of the present invention have been described in more detail with reference to the accompanying drawings, but the present invention is not essentially limited to the exemplary embodiments, and it will be understood by those of ordinary skill in the art that various modifications and equivalents may be made without deviating from the spirit or scope of the invention.

Especially, configurations for executing the technical features of the present invention included in the block diagram and the flow chart illustrated in the drawings attached to the present specification mean a logical boundary between the components. However, according to embodiments of software or hardware, the configurations and functions thereof are executed in the form of an independent software module, a monolithic software structure, a code, a service, and a combination thereof, are stored in a computer-executable medium having processor capable of executing stored program codes, commands, or the likes to realize the functions. Therefore, it should be appreciated that all embodiments belong to the scope of the present invention.

Therefore, the accompanying drawings and techniques therefor will be described with reference to the technical features of the present invention, but should not simply be construed as long as the specific arrangement of software for implementing such technical features is not explicitly stated. In other words, the various embodiments described above may exist, and such embodiments may be partially modified while holding the same technical features as the present invention, and thus the present invention should also be considered to fall within the scope of the present invention.

In addition, in the case of a flow chart, operations are depicted in the drawings in a specific order in order obtain the most desirable result. However, it should not be understood that such operations must be executed in the illustrated specific order or in the sequential order, or all illustrated operations must be executed. In certain instances, multitasking and parallel processing may be advantageous. Moreover, the separation of the various system components of the embodiments described above should not be understood as requiring such separation in all embodiments, and it should be understood that the described program components and systems can be integrated together in a single software product or packaged in multiple software products.

| | |
|---|---|
| 10: Logistics management system | 100: Order processing system |
| 200: Box making system | 300: Rack transfer system |
| 400: Picking system | 500: Packing system |
| 600: Information database | 700: Central control device |
| 710: Communication unit | 720: Order management unit |
| 730: Standard selection unit | 740: Box making management unit |
| 750: Transfer management unit | 760: Picking management unit |
| 770: Packing management unit | |

The invention claimed is:

1. A logistics management system comprising:
an order processing system receiving an order request for each orderer;
a box making system capable of making order boxes for a plurality of reference standards, wherein one reference standard is different from another reference standard in at least one among size and intensity;
a central control device capable of selecting any one among the plurality of reference standards based on the order request, and transmitting a box making command indicating the selected reference standard to the box making system, wherein the box making system makes an order box with the selected reference standard in response to the box making command and supplies the order box to a box supply zone;
a plurality of racks each having at least one loading space capable of loading the order box thereon; and
a plurality of unmanned carriers each capable of transferring one of the plurality of racks from one of the box supply zone, a picking zone, and a packing zone to the other, wherein the central control device controls at least one of the plurality of unmanned carriers to transfer the rack, on which order boxes equal to or greater than a first reference quantity located in the box supply zone are loaded, to the picking zone,
wherein in a case in which picking speed of the picking zone is less than a reference working speed, the central control device controls at least one of the plurality of unmanned carriers to temporarily transfer the rack, on which the order boxes equal to or greater than the first reference quantity located in the box supply zone are loaded, to a picking standby zone provided between the box supply zone and the picking zone.

2. The logistics management system according to claim 1, wherein the central control device determines a lower limit standard for storing an item set according to the order request, compares the plurality of reference standards with the lower limit standard, and selects any one among the plurality of reference standards.

3. The logistics management system according to claim 2, wherein the central control device inputs item information including the number and size of ordered items of the order request into a standardization simulation model to determine the lower limit standard, and where the selected reference standard satisfies: (i) to be equal to or greater than the lower limit size; and (ii) to minimize a size difference with the lower limit standard.

4. The logistics management system according to claim 3, wherein the item information further includes at least one among a weight, a volume, and a three-dimensional shape for each ordered item of the order request.

5. The logistics management system according to claim 1, wherein the box making system attaches a box label, on which a box identification code is printed, to the order box of the selected reference standard.

6. The logistics management system according to claim 1, wherein the central control device assigns different priorities to a plurality of picking work areas in the picking zone, and controls at least one of the plurality of unmanned carriers to transfer the rack, on which the order boxes equal to or greater than the first reference quantity are loaded, to any one picking work area to which the highest priority is assigned, among the plurality of picking work zones.

7. The logistics management system according to claim 1, wherein each of the plurality of racks further comprises:

a rack detector for generating rack monitoring data indicating an occupation state of each loading space provided on the rack, wherein the central control device determines the quantity of the order boxes before picking loaded on the rack located in the picking zone, based on the rack monitoring data collected from the rack detector of the rack located in the picking rack, and wherein in a case in which the determined quantity of the order boxes before picking is between a first reference quantity and a second reference quantity, the central control device controls at least one of the plurality of unmanned carriers to transfer another rack, on which order boxes of more than the first reference quantity located in the box supply zone, to the picking zone.

8. The logistics management system according to claim 7, wherein the central control device determines the quantity of order boxes after picking, which are loaded on the rack located in the picking zone, based on the rack monitoring data collected from the rack detector of the rack located in the picking zone, and wherein in a case in which the determined quantity of the order boxes after picking is between the first reference quantity and a third reference quantity, the central control device controls at least one of the plurality of unmanned carriers to transfer the rack located in the picking zone to the packing zone.

9. The logistics management system according to claim 8, further comprising: a packing system for performing inspection work and packing work with respect to the order boxes loaded on the rack transferred from the picking zone to the packing zone.

10. A logistics management method comprising the steps of:

receiving, by an order processing system, an order request for each order;

selecting, by a central control device, any one among a plurality of reference standards based on the order request, wherein one reference standard is different from another reference standard in at least one among size and intensity;

transmitting, by the central control device, a box making command indicating the selected reference standard to a box making system;

making, by the box making system, an order box of the selected reference standard in response to the box making command, and supplying the order box to a box supply zone;

loading the order box on at least one of a plurality of racks each having at least one loading space; and transferring, by at least one of a plurality of unmanned carriers, one of the plurality of racks from one of the box supply zone, a picking zone, and a packing zone to the other, wherein the central control device controls at least one of the plurality of unmanned carriers to transfer the rack, on which order boxes equal to or greater than a first reference quantity located in the box supply zone are loaded, to the picking zone, wherein in a case in which picking speed of the picking zone is less than a reference working speed, the central control device controls at least one of the plurality of unmanned carriers to temporarily transfer the rack, on which the order boxes equal to or greater than the first reference quantity located in the box supply zone are loaded, to a picking standby zone provided between the box supply zone and the picking zone.

11. The logistics management method according to claim 10, wherein the step of selecting any one among a plurality of reference standards comprises the steps of:

determining a lower limit standard for storing an item set according to the order request; and comparing the plurality of reference standards with the lower limit standard, and selecting any one among the plurality of reference standards.

12. The logistics management method according to claim 11, wherein the step of determining a lower limit standard comprises the step of inputting item information including the number and size of ordered items of the order request into a standardization simulation model to determine the lower limit standard, and wherein the selected reference standard satisfies: (i) to be equal to or greater than the lower limit size; and (ii) to minimize a size difference with the lower limit standard.

* * * * *